(12) United States Patent
Hayashi

(10) Patent No.: US 7,164,248 B2
(45) Date of Patent: Jan. 16, 2007

(54) ELECTRIC MOTOR DRIVE APPARATUS AND MOTOR-DRIVEN POWER STEERING SYSTEM

(75) Inventor: Jirou Hayashi, Aichi-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/839,153

(22) Filed: May 6, 2004

(65) Prior Publication Data

US 2004/0227481 A1 Nov. 18, 2004

(30) Foreign Application Priority Data

May 12, 2003 (JP) ............................. 2003-133671

(51) Int. Cl.
*H02P 7/00* (2006.01)
*B62D 5/04* (2006.01)

(52) U.S. Cl. ...................... 318/434; 318/432; 180/446

(58) Field of Classification Search ............... 318/471, 318/472, 473, 254; 180/130–446; 701/41; 361/23–25
See application file for complete search history.

(56) References Cited

U.S. PATENT DOCUMENTS

| | | | | |
|---|---|---|---|---|
| 4,611,682 A | * | 9/1986 | Yasuda et al. ............... 180/446 |
| 4,662,185 A | * | 5/1987 | Kobayashi et al. ......... 62/228.4 |
| 4,721,894 A | * | 1/1988 | Graber ........................ 318/473 |
| 4,789,040 A | * | 12/1988 | Morishita et al. ........... 180/446 |
| 4,961,033 A | * | 10/1990 | Hirota ........................ 318/560 |
| 4,977,507 A | | 12/1990 | Matsuoka et al. |
| 4,986,379 A | * | 1/1991 | Morishita .................... 180/446 |
| 5,040,630 A | | 8/1991 | Morishita et al. |
| 5,103,926 A | * | 4/1992 | Ohno et al. .................. 180/446 |
| 5,172,566 A | * | 12/1992 | Jung et al. .................... 62/186 |
| 5,257,828 A | * | 11/1993 | Miller et al. ................. 180/446 |
| 5,709,098 A | * | 1/1998 | Itoh et al. ................... 62/228.4 |
| 5,725,052 A | * | 3/1998 | Kawai et al. ................ 165/203 |
| 6,122,153 A | * | 9/2000 | Becker ........................ 361/25 |
| 6,161,069 A | * | 12/2000 | Fujita ........................... 701/41 |
| 6,204,623 B1 | * | 3/2001 | Levy et al. ................. 318/641 |
| 6,326,753 B1 | | 12/2001 | Someya et al. |

(Continued)

FOREIGN PATENT DOCUMENTS

| | | |
|---|---|---|
| EP | 0 361 725 A1 | 4/1990 |
| EP | 0 903 279 A2 | 3/1999 |
| EP | 1 057 715 A2 | 12/2000 |
| EP | 1 120 805 A2 | 8/2001 |
| EP | 1 162 126 A1 | 12/2001 |

(Continued)

OTHER PUBLICATIONS

Office Communication from European Patent Office issued on Mar. 6, 2006 for the corresponding European patent application No. 04010860.7-2425 (a copy thereof).

*Primary Examiner*—Paul Ip
(74) *Attorney, Agent, or Firm*—Posz Law Group, PLC

(57) ABSTRACT

In an electric motor drive apparatus capable of reliably preventing adverse effects on an electric motor, when a control force detected by a torque sensor exceeds a predetermined value, a temperature storing unit stores a temperature detected by a thermistor at that time, and a deviation calculating unit calculates a deviation between the next temperature detected by the thermistor and the temperature stored in the temperature storing unit. When the calculated deviation exceeds a predetermined value, a current limit decision unit sends a limit signal to a current limiting unit. Upon receipt of the limit signal, the current limiting unit gradually decreases the upper limit value of current flowing in the electric motor at a predetermined time interval.

16 Claims, 9 Drawing Sheets

U.S. PATENT DOCUMENTS

| | | | |
|---|---|---|---|
| 6,334,503 B1 | 1/2002 | Fukumura et al. | |
| 6,520,279 B1* | 2/2003 | Fukumoto et al. | 180/446 |
| 6,582,841 B1* | 6/2003 | Okamoto et al. | 429/13 |
| 6,690,138 B1* | 2/2004 | Kaji et al. | 318/783 |
| 6,860,361 B1* | 3/2005 | Takatsuka et al. | 180/446 |
| 6,902,028 B1* | 6/2005 | Takatsuka et al. | 180/446 |
| 2001/0026134 A1* | 10/2001 | Fukumoto et al. | 318/430 |
| 2002/0014877 A1* | 2/2002 | Kaji et al. | 318/783 |
| 2002/0157408 A1* | 10/2002 | Egawa et al. | 62/228.1 |
| 2002/0179363 A1* | 12/2002 | Takatsuka et al. | 180/446 |
| 2002/0189319 A1* | 12/2002 | Abbe | 73/1.01 |
| 2004/0026161 A1* | 2/2004 | Takatsuka et al. | 180/446 |
| 2004/0054456 A1* | 3/2004 | Yoshida et al. | 701/41 |
| 2004/0070353 A1* | 4/2004 | Kayukawa et al. | 318/139 |
| 2004/0095089 A1* | 5/2004 | Collier-Hallman | 318/567 |
| 2004/0189239 A1* | 9/2004 | Islam et al. | 318/701 |
| 2004/0222035 A1* | 11/2004 | Yoneda et al. | 180/443 |
| 2004/0222037 A1* | 11/2004 | Takatsuka et al. | 180/446 |
| 2005/0067210 A1* | 3/2005 | Hayashi | 180/272 |
| 2005/0067213 A1* | 3/2005 | Yasui et al. | 180/443 |
| 2005/0205344 A1* | 9/2005 | Uryu | 180/446 |
| 2005/0242760 A1* | 11/2005 | Fujita et al. | 318/434 |
| 2005/0257986 A1* | 11/2005 | Kagei | 180/404 |

FOREIGN PATENT DOCUMENTS

| | | |
|---|---|---|
| JP | 60-46794 | 3/1985 |
| JP | 1-186468 | 7/1989 |
| JP | 2-37074 | 2/1990 |
| JP | 2-70575 | 3/1990 |
| JP | 2-92781 | 4/1990 |
| JP | 2-246871 | 10/1990 |
| JP | 3-99981 | 4/1991 |
| JP | 3-136974 | 6/1991 |
| JP | 4-110272 | 4/1992 |
| JP | 6-144279 | 5/1994 |
| JP | 8-108858 | 4/1996 |
| JP | 8-133107 | 5/1996 |
| JP | 8-207799 | 8/1996 |
| JP | 8-207809 | 8/1996 |
| JP | 10-67335 | 3/1998 |
| JP | 10-100913 | 4/1998 |
| JP | 10-337084 | 12/1998 |
| JP | 11-208488 | 8/1999 |
| JP | 11-286278 | 10/1999 |
| JP | 2000-72006 | 3/2000 |
| JP | 2000-83383 | 3/2000 |
| JP | 2000-255443 | 9/2000 |
| JP | 2000-344118 | 12/2000 |
| JP | 2001-322555 | 11/2001 |
| JP | 2001-328551 | 11/2001 |
| JP | 2001-341657 | 12/2001 |
| JP | 2002-234456 | 8/2002 |
| JP | 2002-362392 | 12/2002 |
| JP | 2002362392 A * | 12/2002 |
| JP | 2003/312509 | 11/2003 |
| JP | 2003312511 A * | 11/2003 |

* cited by examiner

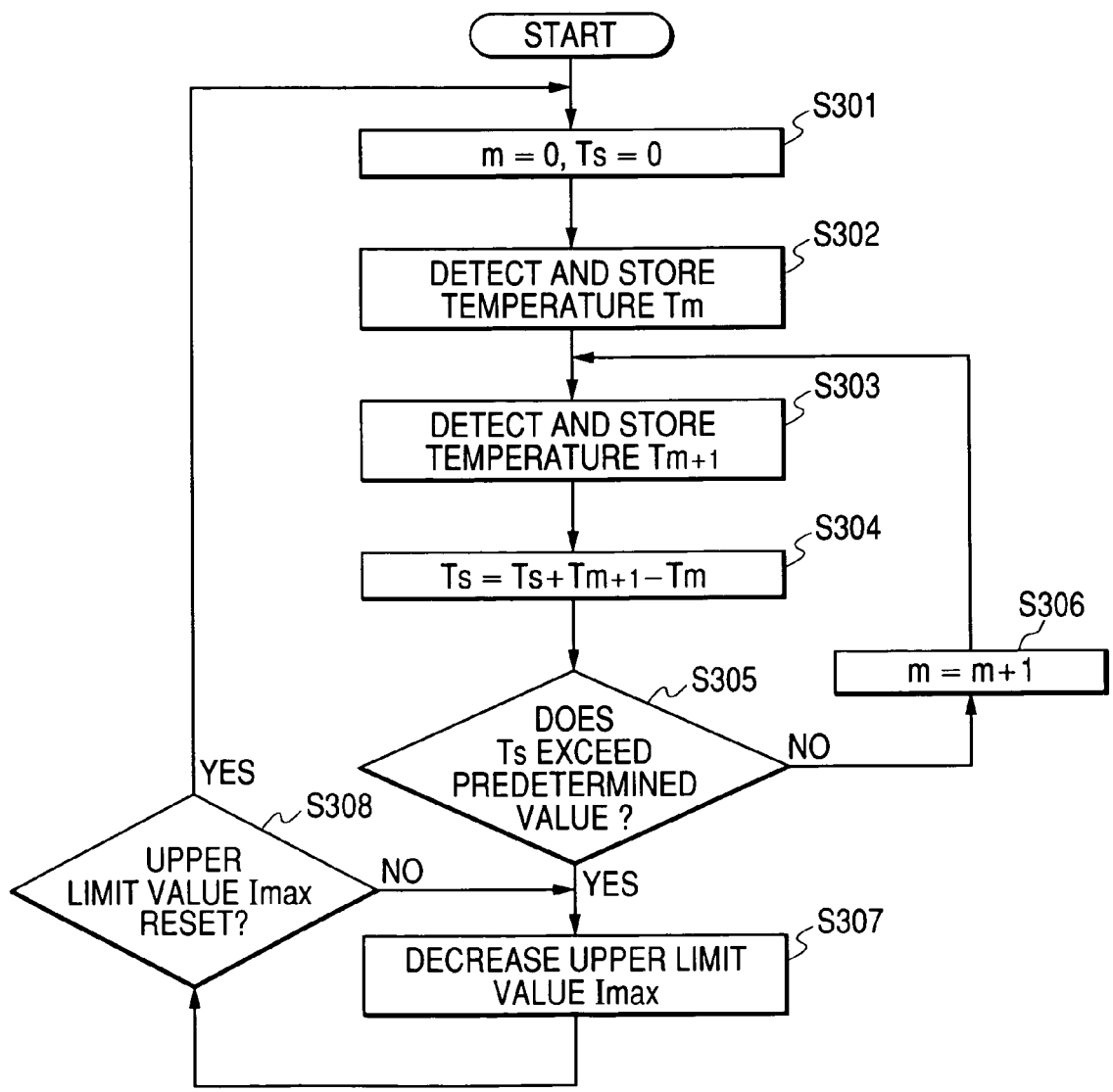

ELECTRIC MOTOR DRIVE APPARATUS AND MOTOR-DRIVEN POWER STEERING SYSTEM

BACKGROUND OF THE INVENTION

1) Field of the Invention

The present invention relates to an electric motor drive apparatus for driving an electric motor and a motor-driven power steering system for the assistance in control force for steering (steering wheel).

2) Description of the Related Art

In a conventional motor-driven power steering system equipped with an electric motor drive apparatus for the assistance in control force for steering, when the temperature of an output stage for driving an electric motor exceeds a critical value, the upper limit value of current flowing in the output stage is decreased to prevent a large current from flowing in the electric motor (for example, see Japanese Patent Laid-Open No. 2000-255443).

However, for example, even in a case in which the current flowing in the output stage rapidly varies largely from a low condition, since the temperature of the output stage does not rise immediately, in the case of the aforesaid motor-driven power steering system in which the upper limit value of current flowing in the electric motor is decreased after the temperature of the output stage exceeds the critical value, there is a problem in that a large current continuously flows in the electric motor from when the temperature of the output stage starts to rise until it exceeds the critical value, which exerts adverse effects thereon.

SUMMARY OF THE INVENTION

The present invention has been developed with a view to eliminating the above-mentioned problems, and it is therefore an object of the invention to provide an electric motor drive apparatus and a motor-driven power steering system which are capable of surely preventing the adverse effects on the electric motor.

For this purpose, in accordance with an aspect of the present invention, there is provided an electric motor drive apparatus comprising an electric motor to be driven when energized and a control unit having a drive element for controlling a current flowing in the electric motor, the control unit including temperature detecting means for detecting a temperature of the drive element at a predetermined time interval and current limiting means for limiting the current flowing in the electric motor on the basis of a deviation between the temperature detected by the temperature detecting means and a temperature obtained in the previous detection.

With this arrangement, because the current limiting means limits the current flowing in the electric motor on the basis of the deviation between the temperature detected by the temperature detecting means and the temperature obtained in the previous detection, on the basis of a variation (build-up quantity) of the temperature of the drive element, the control unit can make a decision as to whether or not a large current is flowing in the electric motor. Therefore, for example, in a case in which the current flowing in the drive element rapidly varies largely from a small condition, unlike the conventional technique which limits the flow of a large current in the electric motor after the temperature of the drive element exceeds (is equal to or more than) a critical value, it is possible to suppress the continuous flow of a large current in the electric motor before the temperature of the drive element exceeds the critical value, thereby reliably preventing the adverse influence on the electric motor.

In this case, the current limiting based on the deviation signifies that the current is limited when the deviation between the temperature detected by the temperature detecting means and the temperature obtained in the previous detection exceeds a predetermined value.

With this arrangement, for example, in a case in which the current flowing in the drive element rapidly varies largely from a small condition, the variation of the temperature of the drive element increases and, hence, the deviation between the temperature detected by the temperature detecting means and the temperature obtained in the previous detection increases. Therefore, if the current limiting means limits the current flowing in the electric motor when this deviation exceeds a predetermined value, it is possible to definitely suppress the continuous flow of a large current in the electric motor.

In addition, according to a further aspect of the present invention, the current limiting means limits the current flowing in the electric motor when the temperature detected by the temperature detecting means exceeds a predetermined value.

With this arrangement, since the current limiting means does not limit the current flowing in the electric motor when the deviation between the temperature detected by the temperature detecting means and the temperature detected previously is below the predetermined value, for example, in a case in which the deviation between the temperature detected by the temperature detecting means and the temperature obtained in the previous detection continuously stands at values below the predetermined value, the actual temperatures of the drive element and the electric motor increase gradually. Thus, if the current flowing in the electric motor is limited by the current limiting means when the temperature detected by the temperature detecting means exceeds the predetermined value, the heat generation in the electric motor is suppressible.

Still additionally, in this case, the current limiting based on the deviation signifies that the deviation between the temperature detected by the temperature detecting means and the temperature obtained in the previous detection is obtained at a predetermined time interval and the current is limited when the integrated value obtained by adding up the obtained deviations exceeds a predetermined value.

With this arrangement, by obtaining the deviation between the temperature detected by the temperature detecting means and the temperature obtained in the previous detection to integrate the obtained deviations at a predetermined time interval, it is possible to detect a build-up quantity of the temperature of the drive element from when the temperature detecting means begins to detect the temperature of the drive element. Therefore, if the current limiting means limits the current flowing in the electric motor when the integrated value exceeds the predetermined value, then the flow of a large current in the electric motor is reliably suppressible.

Yet additionally, the limitation on the current flowing in the electric motor is made to gradually reduce the upper limit value flowing in the electric motor.

Accordingly, if the current limiting means gradually reduces the upper limit value flowing in the electric motor, then a current larger than the upper limit value does not flow in the electric motor, thus enabling the limitation on the current flowing in the electric motor. Furthermore, since the upper limit value is reduced gradually, the current flowing in the electric motor is gradually reducible and, hence, for example, for a motor-driven power steering system, its auxiliary steering operation can be made stable.

Moreover, according to a further aspect of the present invention, the control unit includes upper limit determining means for determining the upper limit value of current flowing in the electric motor on the basis of the magnitude of the deviation between the temperature detected by the temperature detecting means at a predetermined time interval and the temperature obtained in the previous detection.

Accordingly, the control unit can set the upper limit value at a smaller value through the use of the upper limit determining means, for example, when the deviation between the temperature detected by the temperature detecting means and the previously detected temperature stands at a large value, thereby immediately limiting the current flowing in the electric motor.

Still moreover, the upper limit value is decreased when a target current value flowing in the electric motor is smaller than the upper limit value and the difference between the target current value and the upper limit value is below a predetermined value.

Thus, when a target current value flowing in the electric motor is smaller than the upper limit value and the difference between the target current value and the upper limit value is below a predetermined value, it is preferable to decrease the upper limit value, for that the control unit executes the control so that a large current close to the upper limit value flows in the electric motor.

Yet moreover, in the case of decreasing the upper limit value, the control unit immediately removes (cuts out) the upper limit value when the target current value is smaller than the upper limit value and the difference between the target current value and the upper limit value exceeds a predetermined value.

Thus, when the target current value is smaller than the upper limit value and the difference between the target current value and the upper limit value exceeds a predetermined value, the control unit does not carry out the control so that a large current flows in the electric motor. Therefore, the upper limit value is immediately removed at this time and, hence, the normal current can immediately flow in the electric motor. For example, for a motor-driven power steering system, this enables the assistance in control force for steering, and prevents the driver from feeling the heavy weight of the steering operation even if a control force takes place for steering immediately after the target current value is smaller than the upper limit value and the difference between the target current value and the upper limit value exceeds the predetermined value, thereby definitely achieving the assistance in control force for the steering.

In addition, in accordance with a further aspect of the present invention, there is provided an electric motor drive apparatus for use in a motor-driven power steering system comprising a torque sensor for detecting a control force for steering for the assistance in control force for the steering, the current limiting means being made to limit the current flowing in the electric motor only when the torque detected by the torque sensor exceeds a predetermined value.

With this arrangement, since, when the torque detected by the torque sensor increases, the control unit executes the control so that a large current flows in the electric motor, the current limiting means limits the current flowing in the electric motor only when the torque detected by the torque sensor exceeds a predetermined value. Therefore, when the torque detected by the torque sensor is lower than the predetermined value, it does not need that the current limiting means makes a decision as to whether or not to limit the current flowing in the electric motor, which reduces the decision processing in the current limiting means.

Still additionally, in the case of decreasing the upper limit value, the control unit removes the upper limit value immediately after the torque detected by the torque sensor becomes below the predetermined value.

When the torque detected by the torque sensor becomes below the predetermined value, the control unit does not execute the control so that a large current flows in the electric motor. Accordingly, the removal of the upper limit value enables the normal current to immediately flow in the electric motor and, for example, for a motor-driven power steering system, this enables the assistance in control force for steering, and prevents the driver from feeling the heavy weight of the steering operation even if a control force takes place for steering immediately after the target current value is smaller than the upper limit value and the difference between the target current value and the upper limit value exceeds a predetermined value, thereby definitely achieving the assistance in control force for the steering.

Yet additionally, according to a further aspect of the present invention, a heat sink for fixedly holding the drive element is provided, and the temperature detecting means is a thermistor placed on the heat sink.

With this construction, the thermistor functioning as the temperature detecting means is provided in the heat sink to which the drive element is fixedly secured and, hence, the thermistor can detect the temperature of the heat sink. Therefore, when the drive element generates heat, this heat is transmitted to the heat sink and, in consequence, the thermistor can detect the temperature of the drive element by detecting the temperature of the heat sink.

Furthermore, in accordance with a further aspect of the present invention, there is provided a motor-driven power steering system comprising an electric motor to be driven when energized, a torque sensor for detecting a control force for steering and a control unit having a drive element for controlling a current flowing in the electric motor on the basis of a torque detected by the torque sensor, the control unit including temperature detecting means for detecting a temperature of the drive element at a predetermined time interval and current limiting means for limiting a current flowing in the electric motor on the basis of the temperature detected by the temperature detecting means and the torque detected by the torque sensor.

With this arrangement, when the torque detected by the torque sensor stands at a high value, the control unit executes the control whereby a large current flows in the electric motor. Therefore, when the current flowing in the electric motor is limited on the basis of, for example, the temperature detected by the temperature detecting means and the torque detected by the torque sensor, unlike the conventional technique which limits the current flowing in the electric motor after the temperature of the drive element exceeds a critical value, it is possible to suppress the continuous flow of a large current in the electric motor before the temperature of the drive element exceeds the critical value, thereby reliably preventing the adverse influence on the electric motor.

Still furthermore, when the torque detected by the torque sensor exceeds a predetermined value, the limitation on the current flowing in the electric motor is made to reduce the upper limit value of current flowing in the electric motor on the basis of the deviation between the temperature detected by the temperature detecting means and the temperature obtained in the previous detection.

Accordingly, unlike the conventional technique which limits the current flowing in the electric motor after the temperature of the drive element exceeds a critical value, it is possible to suppress the continuous flow of a large current in the electric motor before the temperature of the drive element exceeds the critical value.

BRIEF DESCRIPTION OF THE DRAWINGS

Other objects and features of the present invention will become more readily apparent from the following detailed description of the preferred embodiments taken in conjunction with the accompanying drawings in which:

FIG. 10 is a flow chart showing a processing procedure in the control unit for decreasing the upper limit value of current flowing in the electric motor according to the third embodiment.

DESCRIPTION OF THE PREFERRED EMBODIMENTS

Embodiments of the present invention will be described hereinbelow with reference to the drawings.

(First Embodiment)

As this embodiment, a description will be given hereinbelow of an electric motor drive apparatus for use in a motor-driven power steering system for the assistance in control force for steering.

Figure 1:
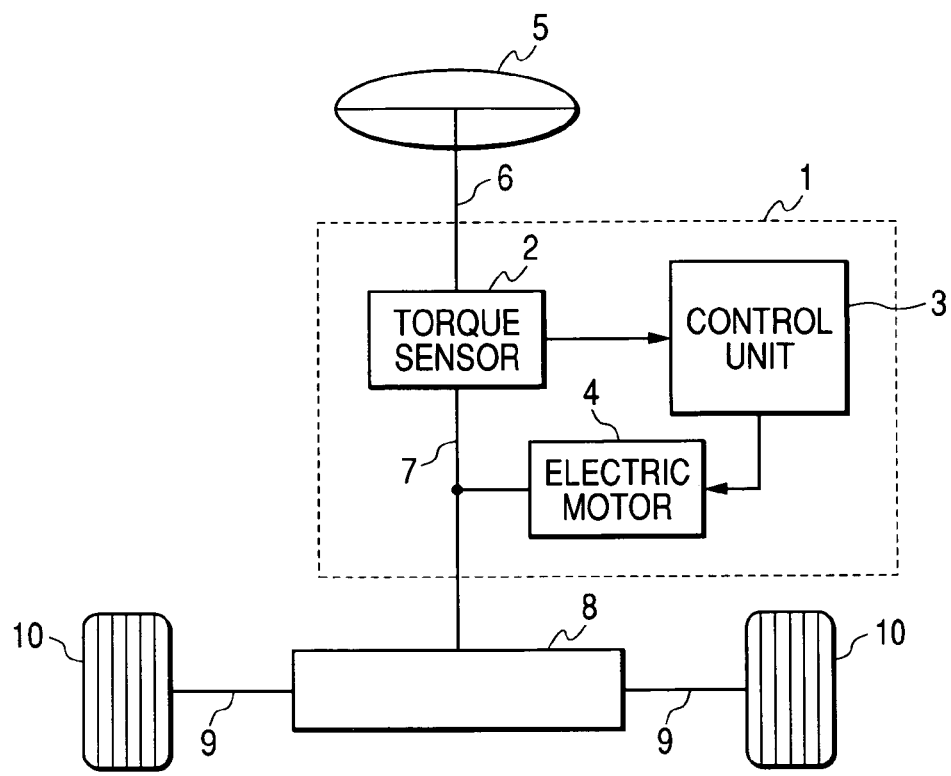
FIG. 1 is an illustration of the entire configuration of a motor-driven power steering system according to a first embodiment of the present invention.
Figure 2:
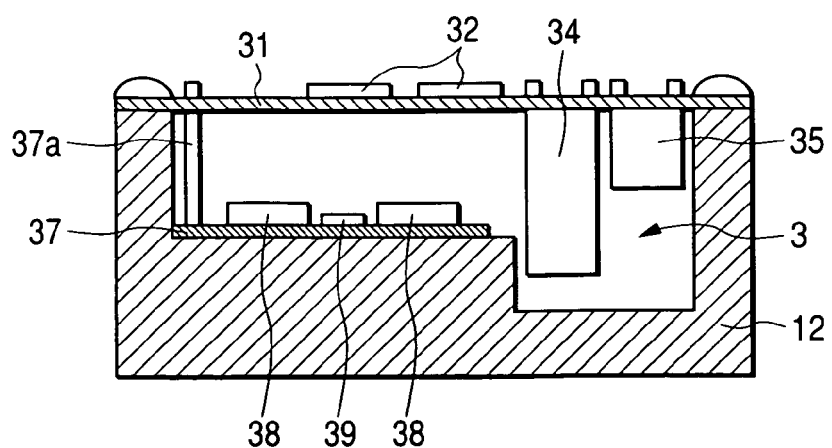
FIG. 2 is a cross-sectional view showing an arrangement of a control unit of the motor-driven power steering system according to the first embodiment.
Figure 3:
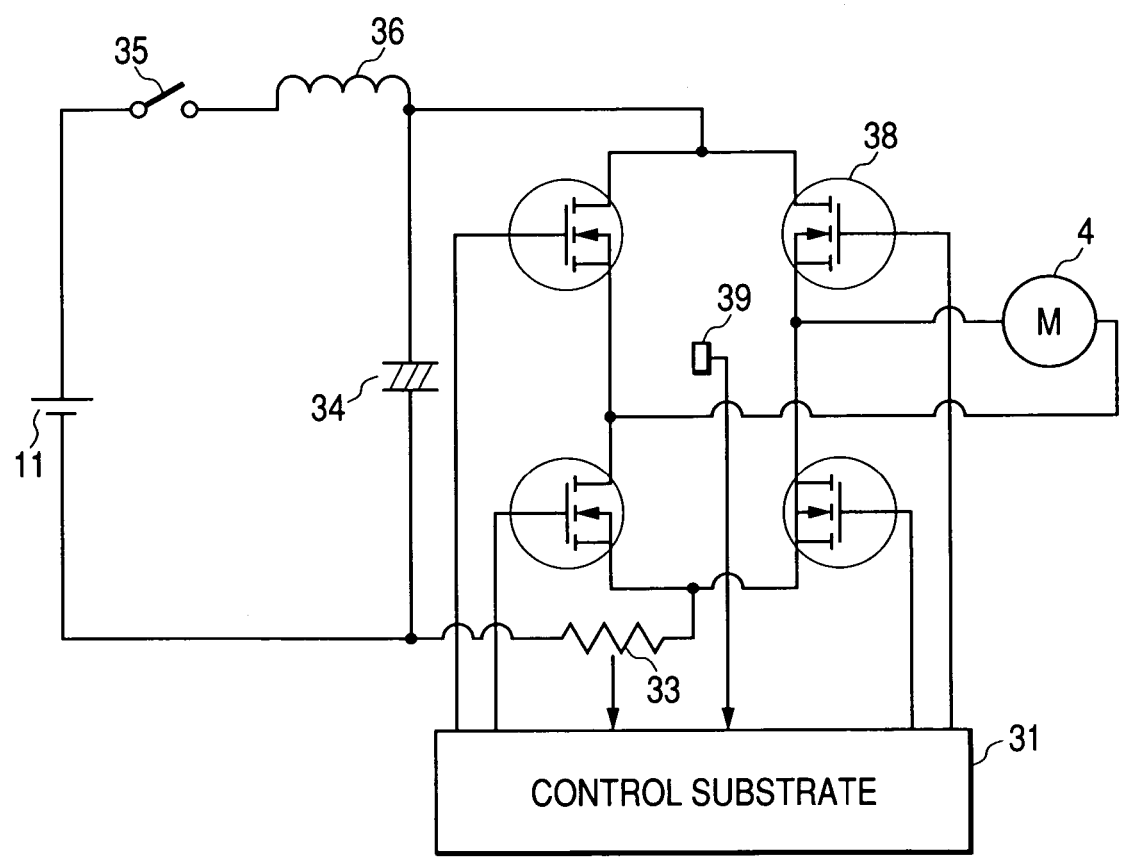
FIG. 3 is an illustration of a drive circuit to be used for driving an electric motor of the motor-driven power steering system according to the first embodiment.
Figure 4:
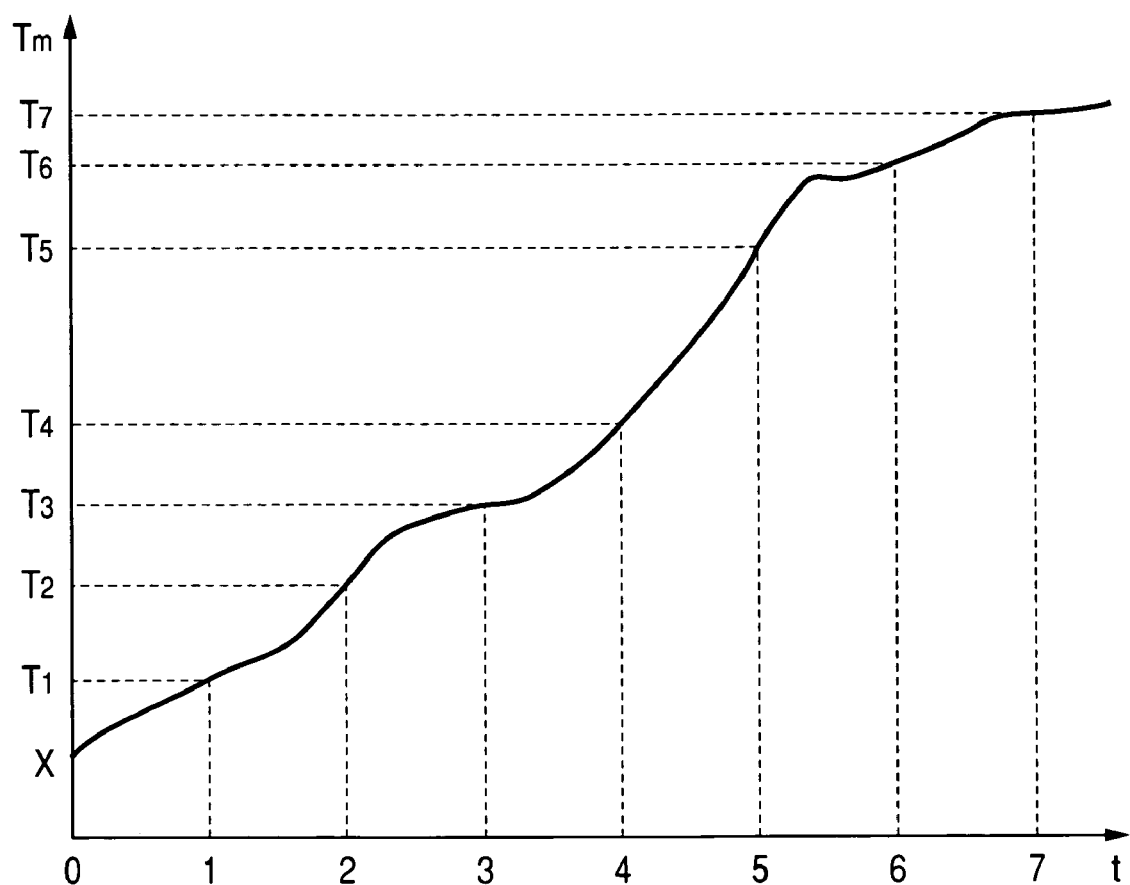
FIG. 4 is an graphic illustration of an example of temperature to be detected through the use of a temperature detecting means according to the first embodiment.
Figure 5:
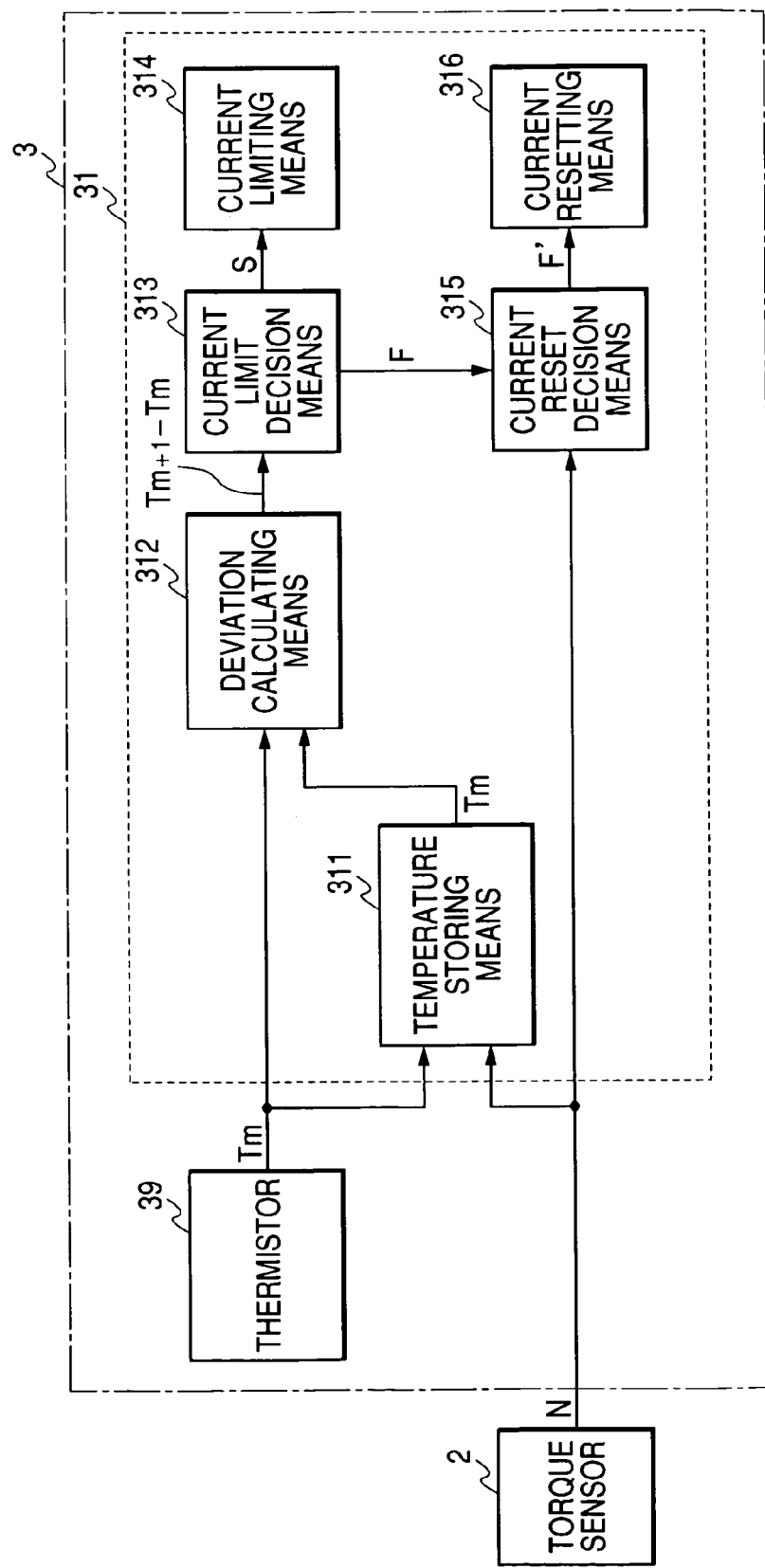
FIG. 5 is a block diagram showing a configuration of the control unit for decreasing an upper limit value of current flowing in the electric motor according to the first embodiment.
Figure 6:
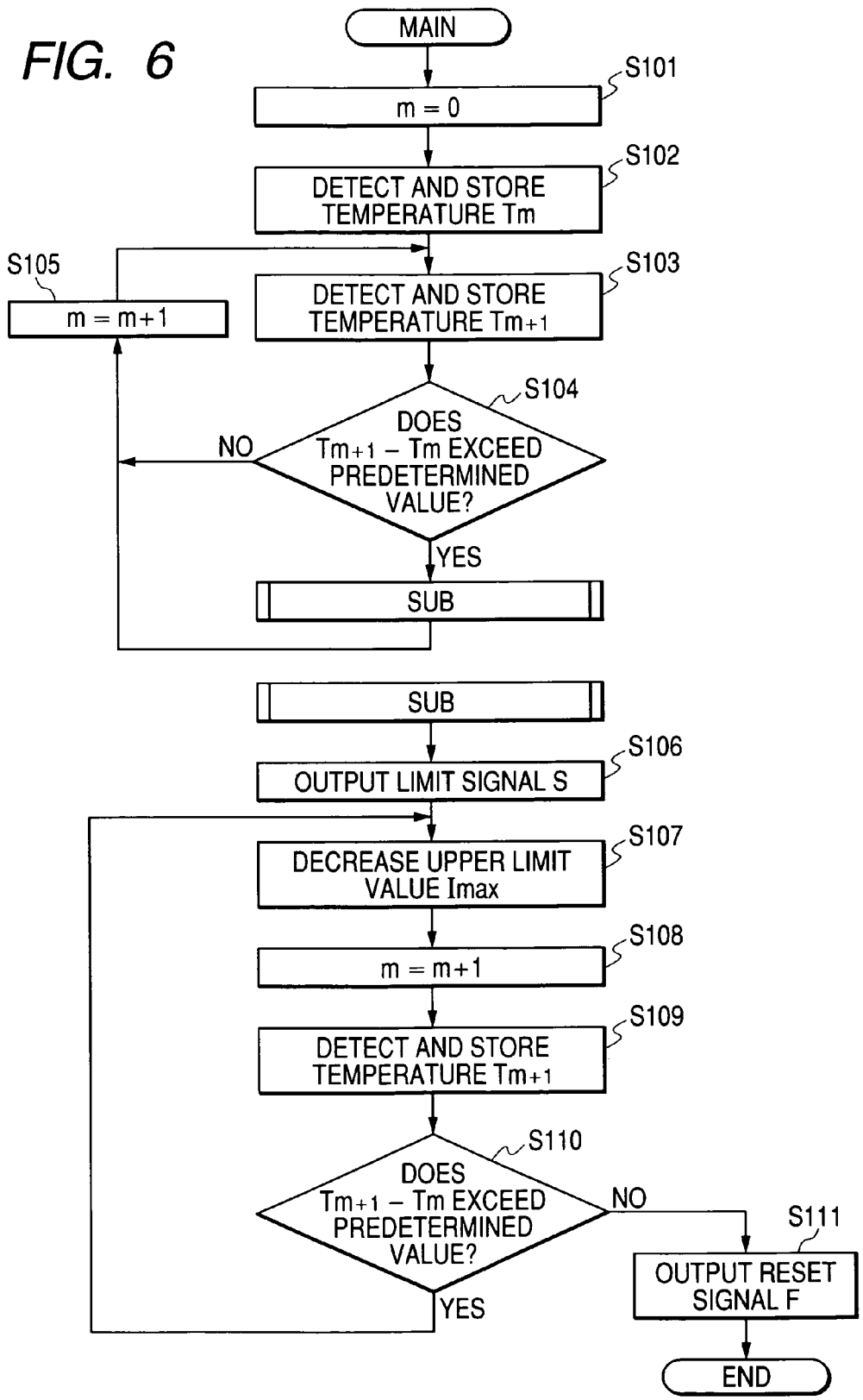
FIG. 6 is a flow chart showing a processing procedure in the control unit for decreasing the upper limit value of current flowing in the electric motor according to the first embodiment.
Figure 7:
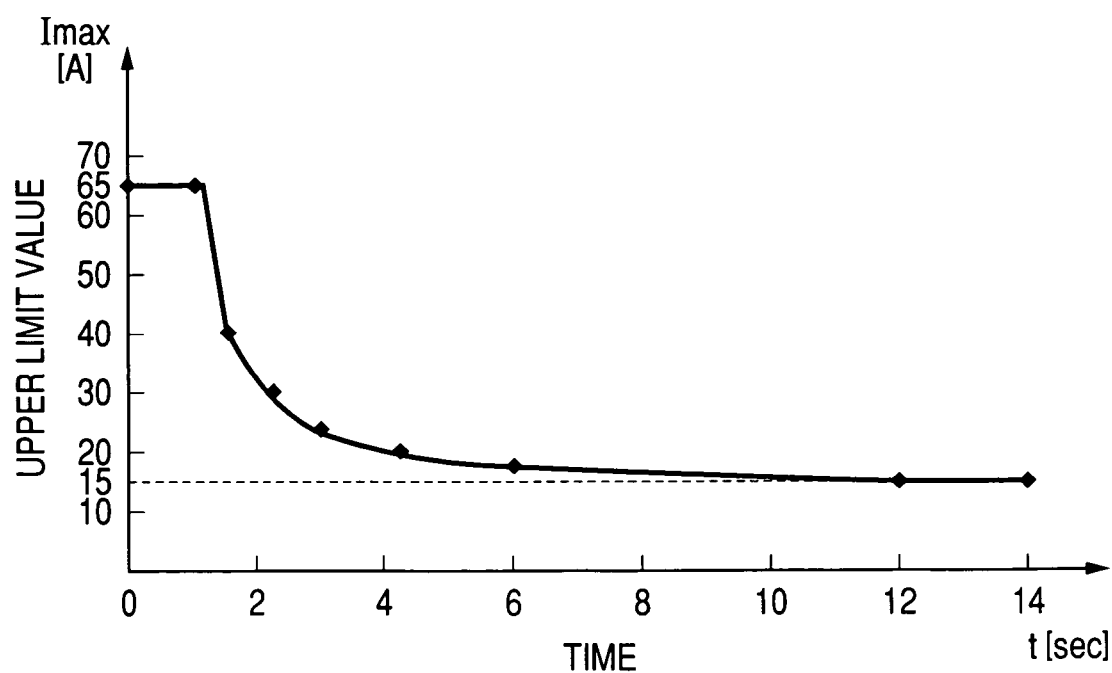
FIG. 7 is a graphic illustration of a variation of the upper limit value when the control unit decreases the upper limit value of current flowing in the electric motor according to the first embodiment.

FIG. 1 is an illustration of the entire configuration of a motor-driven power steering system 1 according to a first embodiment of the present invention. FIG. 2 is a cross-sectional view showing an arrangement of a control unit 3 of the motor-driven power steering system 1. FIG. 3 is an illustration of a drive circuit to be used for driving an electric motor 4 of the motor-driven power steering system 1. FIG. 4 is an graphic illustration of an example of temperature to be detected through the use of a temperature detecting means 39. FIG. 5 is a block diagram showing the control unit 3 for decreasing an upper limit value $I_{max}$ (of current flowing) in the electric motor 4. FIG. 6 is a flow chart showing a processing procedure in the control unit 3 for decreasing the upper limit value $I_{max}$ in the electric motor 4. FIG. 7 is a graphic illustration of a variation of the upper limit value $I_{max}$ when the control unit 3 decreases the upper limit value $I_{max}$ in the electric motor 4.

First, referring to FIG. 1, a description will be given hereinbelow of the entire configuration and operation of the motor-driven power steering system 1. The motor-driven power steering system 1 according to this embodiment is made up of a torque sensor 2, a control unit 3 and an electric motor 4.

The torque sensor 2 is provided between an input shaft 6 joined to a steering wheel 5 and an output shaft 7 joined to a pinion (not shown) located in a steering box 8 to detect a control force (steering force) applied to the steering wheel 5.

The control unit 3 receives a control force detected by the torque sensor 2 to determine a current to be supplied to the electric motor 4 on the basis of the received control force.

The electric motor 4 is rotated by the flow of a current determined by the control unit 3 to provide this torque (turning force) to the output shaft 7.

The pinion located in the steering box 8 engages with a rack 9, and each of both ends of the rack 9 is connected through a tie rod (not shown) and an arm (not shown) to a wheel 10.

Thus, when a driver turns the steering wheel 5, the torque sensor 2 detects a control force applied to the steering wheel 5. Moreover, the control unit 3 determines a current to be supplied to the electric motor 4 on the basis of the control force detected by the torque sensor 2, and the electric motor 4 rotates when the determined current flows therein. Still moreover, the torque of the electric motor 4 is transmitted to the output shaft 7 for assisting in control force on the steering wheel 5, thereby easing the turning operation of the steering wheel 5 by the driver.

Secondly, referring to FIGS. 2 and 3, a description will be given hereinbelow of a configuration and circuit arrangement of the control unit 3.

On a control substrate 31 of the control unit 3, there are provided a microcomputer 32, a shunt resistor 33, a capacitor 34, a relay 35 and a coil 36, and on a metal substrate 37 of the control unit 3, there are provided switching transistors 38 and a thermistor 39. Moreover, the control substrate 31 and the metal substrate 37 are electrically connected to each other through a terminal 37a. Still moreover, the control substrate 31 and the metal substrate 37 are fixedly secured to a housing 12.

The microcomputer 32 determines a current, to be supplied to the electric motor 4, in accordance with a control force from the torque sensor 2 and produces a PWM drive signal for implementing the duty control of the switching transistors 38. Moreover, the microcomputer 32 receives a voltage value corresponding to a voltage drop across the shunt resistor 33 and detects a current flowing in the electric motor 4 for the feedback control. The capacitor 34 and the coil 36 are for suppressing the generation of noise in a current from a battery 11. The relay 35 is for supplying and cutting off a current flowing into the electric motor 4 through the on/off operations of an ignition switch (not shown).

The switching transistors 38 constitute a drive element and are four in number to make a bridge circuit. The switching transistors 38 is put in operation in response to a PWM drive signal from the microcomputer 32 to carry out the duty control on a current flowing in the electric motor 4 for driving the electric motor 4.

The thermistor 39 functions as a temperature detecting means and is placed on a surface where the four switching transistors 38 are fixed and located at a position close to the four switching transistors 38. Moreover, the thermistor 39 detects the temperature of the metal substrate 37 and the housing 12, to which the heat generated from the switching transistors 38 is transmitted, at a predetermined time interval (every predetermined time) and inputs the detected temperature to the microcomputer 32. Still moreover, the microcomputer 32 detects, as the temperature of the switching transistors 38, the temperature of the metal substrate 37 and the housing 12 through the use of the thermistor 39.

In addition, the + terminal of the battery 11 is connected through the relay 35 and the coil 36 to one end of the capacitor 34 and further to the switching transistor 38. The other end of the capacitor 34 is connected to the − terminal of the battery 11. Still additionally, the switching transistors 38 are connected through the shunt resistor 33 to the − terminal of the battery 11.

Furthermore, as shown in FIG. 5, for reducing an upper limit value $I_{max}$ in the electric motor 4, the microcomputer 32 includes a temperature storing means 311, a deviation calculating means 312, a current limit decision means 313, a current limiting means 314, a current reset (return) decision means 315 and a current resetting (returning) means 316. For the detection of the temperature T by the thermistor 39 at a predetermined time interval, a temperature detected by the thermistor 39 is taken as $T_m$ and a temperature detected by the thermistor 39 next time is taken as $T_{m+1}$.

The temperature storing means 311 receives a control force N detected by the torque sensor 2 and, when the control force N exceeds a predetermined value (6 Nm), stores the temperature $T_m$ detected by the thermistor 39 at that time. Moreover, the temperature storing means 311 outputs the stored temperature $T_m$ to the deviation calculating means 312.

The deviation calculating means 312, when receiving the temperature $T_m$ from the temperature storing means 311, calculates a deviation $T_{m+1} - T_m$ between the temperature $T_{m+1}$ next detected by the thermistor 39 and the temperature $T_m$ from the temperature storing means 311.

The current limit decision means 313 receives the deviation $T_{m+1} - T_m$ calculated by the deviation calculating means 312 and, when the deviation $T_{m+1} - T_m$ exceeds (is equal to or more than) a predetermined value, sends a limit signal S to the current limiting means 314. Moreover, when the received deviation $T_{m+1} - T_m$ becomes below the predetermined value after sending the limit signal S to the current limiting means 314, the current limit decision means 313 sends a reset (return) signal F to the current reset decision means 315.

In the current limiting means 314, values to be used for decreasing the upper limit value $I_{max}$ in the electric motor 4 at a predetermined time interval (every predetermined time) are stored in the form of a map in advance. When receiving the limit signal S from the current limit decision means 313, as shown in the graphic illustration of FIG. 7, on the basis of the upper limit value $I_{max}$ stored in the map in advance, the current limiting means 314 gradually reduces the upper limit value $I_{max}$ in the electric motor 4.

When receiving the reset signal F from the current limit decision means 313, the current reset decision means 315 feeds a current reset signal F' to the current resetting means 316. Moreover, the current reset decision means 315 receives a control force N detected by the torque sensor 2 and, when the control force N is below a predetermined value (2 Nm), the current reset decision means 315 also feeds the current reset signal F' to the current resetting means 316.

When receiving the current reset signal F' from the current reset decision means 315, the current resetting means 316 immediately cuts out the upper limit value $I_{max}$ in the electric motor 4.

Referring to a flow chart of FIG. 6, a description will be given hereinbelow of a processing procedure in the microcomputer 32 for decreasing the upper limit value $I_{max}$ in the electric motor 4 according to this embodiment in the case of assuming that the temperature $T_m$ detected by the thermistor 39 at a predetermined time interval varies from a temperature T0 to a temperature T7 in the following table 1 as shown in FIG. 4. In this case, let it be assumed that the control force N detected by the torque sensor 2 exceeds a predetermined value between T0 and T7.

TABLE 1

|  | T0 | T1 | T2 | T3 | T4 | T5 | T6 | T7 |
|---|---|---|---|---|---|---|---|---|
| Temp. [° C.] | x | x + 0.1 | x + 0.15 | x + 0.2 | x + 0.25 | x + 1.5 | x + 1.6 | x + 1.62 |

In the flow chart of FIG. 6, the procedure starts at a step S101 where an initial value 0 is substituted for m, then followed by a step S102.

In the step S102, the thermistor 39 detects the temperature $T_m$ (T0), with the detected temperature $T_m$ (T0) being stored in the temperature storing means 311. The operational flow then advances to a step S103.

In the step S103, after the elapse of a predetermined time, the thermistor 39 detects the next temperature $T_{m+1}$ (T1), with the detected temperature $T_{m+1}$ (T1) being stored in the temperature storing means 311 and inputted to the deviation calculating means 312, then followed by a step S104.

In the step S104, the deviation calculating means 312 calculates the deviation $T_{m+1} - T_m$ between the temperature $T_{m+1}$ (T1) inputted thereto in the step S103 and the temperature $T_m$ (T0) stored in the temperature storing means 311 in the step S102, with the calculated deviation $T_{m+1} - T_m$ being inputted to the current limit decision means 313. Moreover, when the deviation $T_{m+1} - T_m$ exceeds (is equal to or more than) a predetermined value, the current limit decision means 313 sends a limit signal S to the current limiting means 314. On the other hand, if the deviation $T_{m+1} - T_m$ does not reach the predetermined value, then the operational flow proceeds to a step S105. In this connection, according to this embodiment, the deviation $T_{m+1} - T_m$ exceeds 1.0, the operational flow goes to a subroutine SUB. At this time, the deviation $T_{m+1} - T_m$ (T1−T0) stands at 0.1 and, hence, the operational flow proceeds to a step 105.

In the step S105, the value of m is incremented, and the operational flow then returns to the step S103 to repeatedly conduct the above-mentioned processing. Moreover, according to this embodiment, at m=4, the deviation $T_{m+1}-T_m$ (T5-T4) exceeds 1.0, the operational flow advances to the subroutine SUB.

A description will be given hereinbelow of a processing procedure in the subroutine SUB.

In a step S106, the current limit decision means 313 outputs a limit signal S to the current limiting means 314, then followed by a step S107.

In the step S107, the current limiting means 314 sets the upper limit value $I_{max}$ in the electric motor 4 at a limit value stored as a map in advance, then followed by a step S108.

In the step S108, as well as the step S105, the value of m is incremented, then advancing to a step S109. At this time, m=5.

In the step S109, as well as the step S103, the next temperature $T_{m+1}$ (T6) is detected and stored in the temperature storing means 311. In addition, it is also inputted to the deviation calculating means 312. Following this, the operational flow proceeds to a step S110.

In the step S110, as in the case of the step S104, the deviation calculating means 312 calculates the deviation $T_{m+1}-T_m$ between the temperature $T_{m+1}$ (T6) inputted to the deviation calculating means 312 in the step S109 and the temperature $T_m$ (T5) stored in the temperature storing means 311 in the step S103, with the calculated deviation $T_{m+1}-T_m$ being inputted to the current limit decision means 313. Moreover, when the current limit decision means 313 shows that the deviation $T_{m+1}-T_m$ exceeds a predetermined value (1.0), the operational flow returns to the step S107, and the current limiting means 314 sets the upper limit value $I_{max}$ in the electric motor 4 at a next limit value stored as the map in a advance. Until the deviation $T_{m+1}-T_m$ becomes below the predetermined value, the current limiting means 314 successively sets the upper limit value $I_{max}$ in the electric motor 4 at a limit value stored in the map. On the other hand, if the deviation $T_{m+1}-T_m$ is below the predetermined value, the operational flow proceeds to a step S111. That is, at this time, the deviation $T_{m+1}-T_m$ (T6-T5) is 0.1 and, hence, the operational flow proceeds to the step S111.

In the step S111, the current limit decision means 313 outputs a reset signal F to the current reset decision means 315 which in turn outputs a current reset signal F' to the current resetting means 316. Moreover, when receiving the current reset signal F', the current resetting means 316 immediately cuts out the upper limit value $I_{max}$, and the operational flow returns to the step S105 in the main processing to repeat the above-described processing.

In this embodiment, as shown in FIG. 7, the rated value of the upper limit value $I_{max}$ in the electric motor 4 is at 65 A, and the upper limit value $I_{max}$ gradually decreases from 65 A to 15 A in a manner such that the current limiting means 314 successively sets the upper limit value $I_{max}$ at a limit value stored in the map at a predetermined time interval.

In this connection, the current limit decision means 313 outputs the limit signal S to the current limiting means 314 also in a case in which a target current value which flows in the electric motor 4 in response to a command from the microcomputer 32 is lower than the upper limit value $I_{max}$ and the difference between this target current value and the upper limit value $I_{max}$ exceeds a predetermined value. Moreover, the current limit decision means 313 outputs a reset signal F to the current reset decision means 315 in a case in which the target current value which flows in the electric motor 4 by the microcomputer 32 is lower than the upper limit value $I_{max}$ and the difference between this target current value and the upper limit value $I_{max}$ is below the predetermined value.

[Effects of First Embodiment]

As described above, the microcomputer 32 detects, as a temperature of the switching transistors 38, a temperature detected through the use of the thermistor 39 at a predetermined time interval, and reduces the upper limit value $I_{max}$ in the electric motor 4 when the deviation $T_{m+1}-T_m$ between the temperature $T_m$ stored in the temperature storing means 311 and the temperature $T_{m+1}$ next detected exceeds a predetermined value. Thus, since the upper limit value $I_{max}$ in the electric motor 4 can be reduced on the basis of a variation of temperature of the switching transistors 38, for example, in a case in which the current flowing in the electric motor 4 rapidly varies largely from a low state, unlike the conventional technique in which the upper limit value $I_{max}$ in the electric motor 4 is reduced after the actual temperature T of the switching transistors 38 detected by the thermistor 39 exceeds a critical value, the upper limit value $I_{max}$ in the electric motor 4 is reducible before the actual temperature T of the switching transistors 38 detected by the thermistor 39 exceeds a critical value, which can definitely suppress the continuous flow of a large current in the electric motor 4 to prevent the adverse influence thereon.

In addition, since the microcomputer 32 executes the control to make a large current flow in the electric motor 4 when a control force N detected by the torque sensor 2 becomes large (when the control force N detected by the torque sensor 2 exceeds a predetermined value), the upper limit value $I_{max}$ in the electric motor 4 is decreased on the basis of the deviation $T_{m+1}-T_m$. Therefore, when the control force N detected by the torque sensor 2 is below the predetermined value, there is no need to make a decision as to whether or not to reduce the upper limit value $I_{max}$ in the electric motor 4 on the basis of the deviation $T_{m+1}-T_m$. This reduces the limit decision processing on the upper limit value $I_{max}$, which reduces the software load.

Still additionally, in a case in which the current limiting means 314 reduces the upper limit value $I_{max}$ in the electric motor 4, since the microcomputer 32 executes the control to prevent a large current from flowing in the electric motor 4 when the control force N detected by the torque sensor 2 becomes small, the upper limit value $I_{max}$ in the electric motor 4 is immediately cut out when the control force N detected by the torque sensor 2 becomes below a predetermined value. Therefore, for example, even if a large control force N is immediately applied to the steering wheel 5 after the control force N becomes below the predetermined value, no limitation is imposed on the current flowing in the electric motor 4, which prevents a driver from feeling the heavy weight of the operation of the steering wheel 5, thereby surely achieving the assistance in control force on the steering wheel 5.

Yet additionally, since the microcomputer 32 executes the control to inhibit a large current from flowing in the electric motor 4 also in a case in which a target current value to be supplied to the electric motor 4 by the microcomputer 32 is smaller than the upper limit value $I_{max}$ and the difference between this target current value and the upper limit value $I_{max}$ exceeds a predetermined value, when the upper limit value $I_{max}$ in the electric motor 4 is immediately cut out, the effects analogous to those mentioned above are attainable.

On the other hand, in a case in which the target current value for the supply to the electric motor 4 by the microcomputer 32 is smaller than the upper limit value $I_{max}$ and the difference between this target current value and the upper limit value $I_{max}$ is below the predetermined value, since the microcomputer 32 implements the control so that a large current close to the upper limit value $I_{max}$ flows in the electric motor 4, it is desirable that the current limiting means 314 reduces the upper limit value $I_{max}$ in the electric motor 4.

Moreover, since the current limiting means 314 successively sets the upper limit value $I_{max}$ at a limit value stored in the map in advance at a predetermined time interval, it is possible to gradually reduce the current flowing in the electric motor 4, which stabilizes the auxiliary steering operation on the steering wheel 5 by a driver to prevent the driver from having uncomfortable feeling.

Still moreover, since the thermistor 39 is located on a surface of the metal substrate 37 where the four switching transistors 38 exist in a state fixed and at a position in the vicinity of the four switching transistors 38, the thermistor 39 can detect the temperature of the metal substrate 37. Therefore, when the switching transistors 38 generate heat, the heat is transmitted to the metal substrate 37 and the housing 12 and, hence, the thermistor 39 can detects the temperature of the metal substrate 37 as the temperature T of the switching transistors 38.

The metal substrate 37 and the housing 12 according to this embodiment correspond to a heat sink in the present invention.

Incidentally, although in this embodiment the thermistor 39 is placed on the metal substrate 37, the position of the thermistor 39 is not limited thereto provided that the temperature T of the switching transistors 38 is detectable.

Moreover, although in this embodiment the switching transistors 38 are fixedly secured through the metal substrate 37 to the housing 12, it is also acceptable that they are directly fixed to the housing 12.

Still moreover, although in this embodiment the upper limit value $I_{max}$ for the electric motor 4 is decreased when the deviation $T_{m+1}-T_m$ is equal to or more than a predetermined value, in a case in which the state in which the deviation $T_{m+1}-T_m$ is below the predetermined value continues, the control is not executed so as to decrease the upper limit value $I_{max}$. However, for example, in a case in which the temperature of the switching transistors 38 rises gradually, the actual temperature of the switching transistors 38 rises little by little. Therefore, if the microcomputer 32 decreases the upper limit value $I_{max}$ also when the temperature T detected by the thermistor 39 exceeds a predetermined value, then the heat generation in the electric motor 4 is suppressible.

Yet moreover, it is also appropriate that a decreasing range (width) is determined in accordance with the magnitude of the deviation $T_{m+1}-T_m$ stored at a predetermined time interval and a new upper limit value $I_{max}$ is then determined on the basis of the determined decreasing range to limit the current flowing in the electric motor 4 on the basis of this upper limit value $I_{max}$. The decreasing range to be determined in accordance with the magnitude of the deviation $T_{m+1}-T_m$ is stored in a map in advance. Therefore, for example, when the decreasing range is made larger in a case in which the deviation $T_{m+1}-T_m$ is large, it is possible to immediately limit the current flowing in the electric motor 4.

(Second Embodiment)

Figure 8:
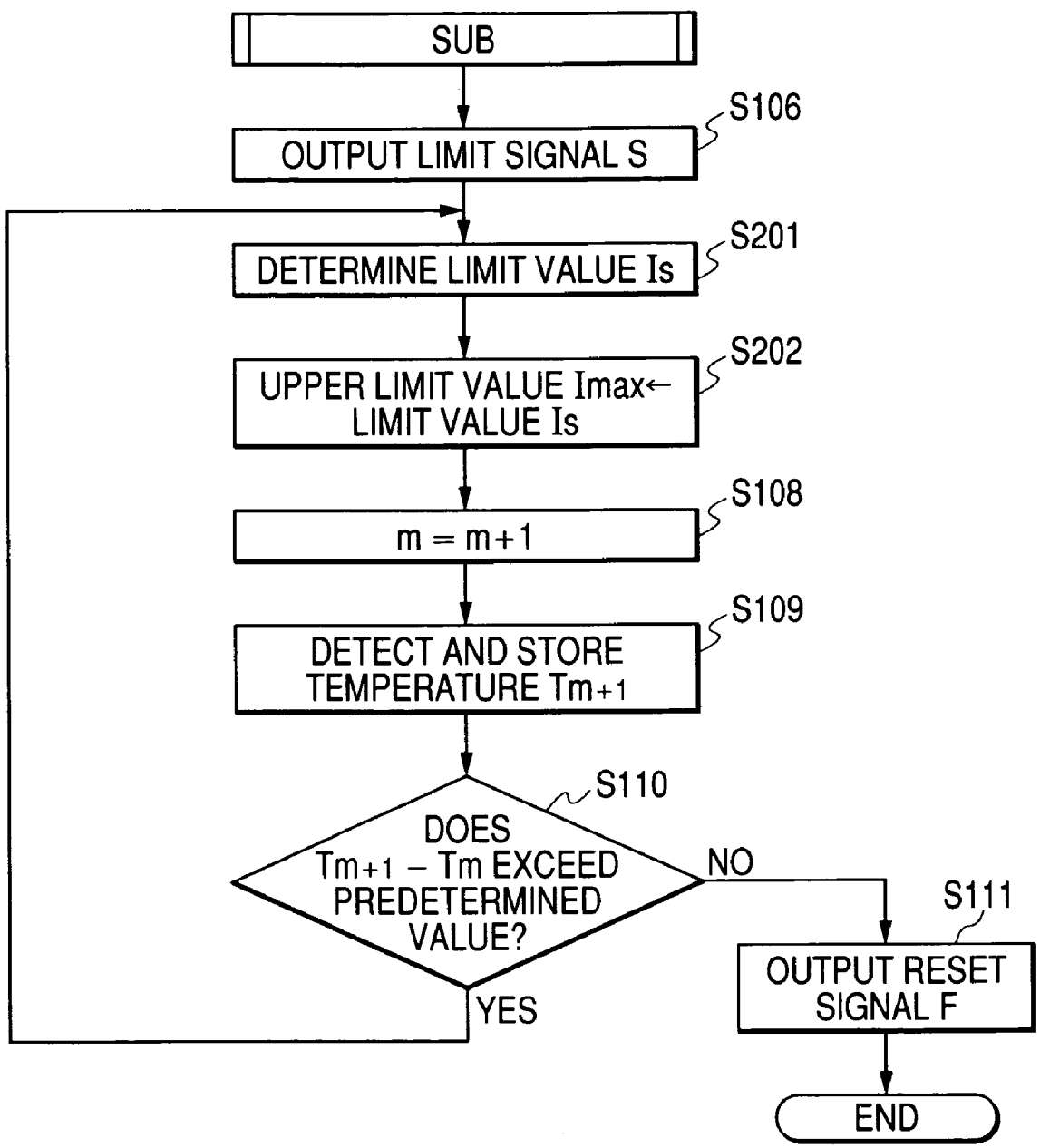
FIG. 8 is a flow chart showing a processing procedure in a control unit for decreasing an upper limit value of current flowing in an electric motor according to a second embodiment of the present invention.

FIG. 8 is a flow chart showing a processing procedure in a control unit 3 which is to be conducted in decreasing an upper limit value $I_{max}$ flowing in the electric motor 4. The same parts in this embodiment as those in the first embodiment will be omitted from the description, and a description will be given hereinbelow of only the differences therebetween.

The basic processing procedure in a microcomputer 32 according to this embodiment is the same as that according to the first embodiment, but for a current limiting means 314 to limit the upper limit value $I_{max}$ in the electric motor 4, steps S201 and S202 as shown in FIG. 8 are implemented in place of the step S107 in the subroutine according to the first embodiment.

Referring to FIG. 8, a description will be given hereinbelow of a processing procedure in the control unit 3 according to this embodiment.

In the step S201, a maximum current (upper limit) determining means (not shown) determines a limit value Is for limiting the upper limit value $I_{max}$ in accordance with the magnitude of a deviation $T_{m+1}-T_m$ calculated in the deviation calculating means 312, and the operational flow advances to the step S202. In this embodiment, as the maximum current determining means, the microcomputer 32 stores the limit value Is corresponding to the magnitude of the deviation $T_{m+1}-T_m$ in the form of a map in advance. In this map, the limit value Is becomes lower as the magnitude of the deviation $T_{m+1}-T_m$ increases.

In the step S202, the upper limit value $I_{max}$ in the electric motor 4 is set at the limit value Is determined in the step S201, and the operational flow proceeds to the step S108.

In this embodiment, since the limit value Is is determined in accordance with the magnitude of the deviation $T_{m+1}-T_m$ calculated in the deviation calculating means 312, that is, since the upper limit value $I_{max}$ can be decreased in accordance with the magnitude of a variation of the temperature $T_m$ detected by the thermistor 39, for example, in a case in which the variation of the temperature $T_m$ detected by the thermistor 39 stands at a large value, the limit value Is is decreased, thereby decreasing the upper limit value $I_{max}$ to immediately limit the current flowing in the electric motor 4.

(Third Embodiment)

Figure 9:
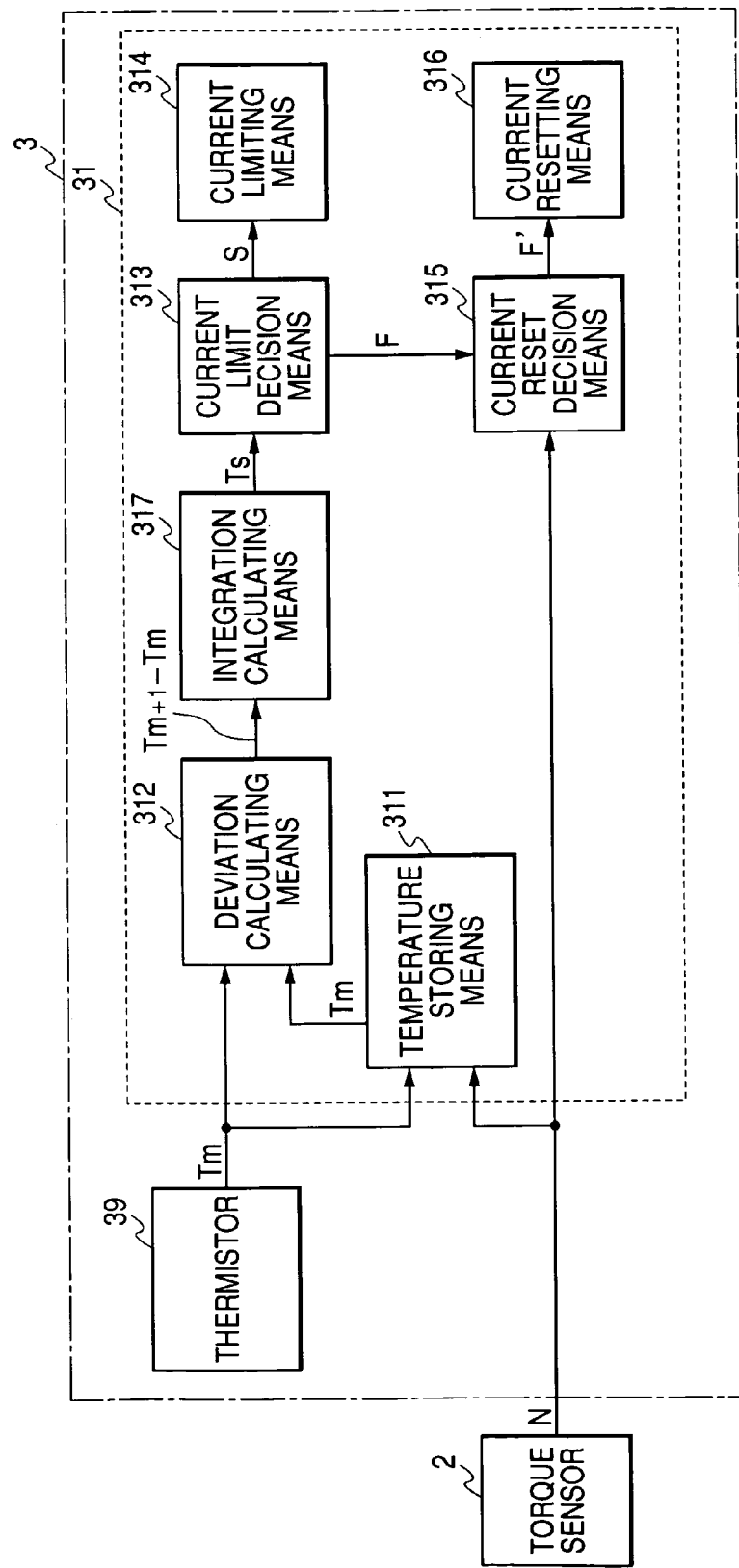
FIG. 9 is a flow chart showing a processing procedure in a control unit for decreasing an upper limit value of current flowing in an electric motor according to a third embodiment of the present invention.

FIG. 9 is a block diagram showing a control unit 3 which is for decreasing the upper limit value $I_{max}$ in the electric motor 4. FIG. 10 is a flow chart showing a processing procedure in the control unit 3 which is to be conducted in decreasing the upper limit value $I_{max}$ in the electric motor 4. The same parts in this embodiment as those in the first embodiment will be omitted from the description, and a description will be given hereinbelow of only the differences therebetween.

In this embodiment, the deviation $T_{m+1}-T_m$ calculated in the deviation calculating means 312 is added up at a predetermined time interval, and the upper limit value $I_{max}$ in the electric motor 4 is decreased on the basis of the resultant integrated value Ts. Therefore, as shown in FIG. 9, a microcomputer 32 includes an integration calculating means 317 for adding up the deviations $T_{m+1}-T_m$.

The integration calculating means 317 receives the deviation $T_{m+1}-T_m$ calculated in the deviation calculating means 312 at a predetermined time interval to integrate the received deviations $T_{m+1}-T_m$ for outputting the integrated value Ts to the current limit decision means 313.

The current limit decision means 313 receives the integrated value Ts obtained by adding up the deviation $T_{m+1}-T_m$ at the predetermined time interval in the integration calculating means 317 and, when the received integrated value Ts exceeds a predetermined value, sends a limit signal S to the current limiting means 314.

Referring to the flow chart of FIG. 10, a description will be given hereinbelow of a processing procedure in the microcomputer 32 for decreasing the upper limit value $I_{max}$ in the electric motor 4 according to this embodiment in a case in which the temperature $T_m$ detected by the thermistor 39 at a predetermined time interval varies from a temperature T0 to a temperature T7 in the following table 2 as shown in FIG. 4. As well as the first embodiment, in this embodiment, let it be assumed that the control force N detected by the torque sensor 2 exceeds a predetermined value between T0 and T7.

TABLE 2

|  | T0 | T1 | T2 | T3 | T4 | T5 | T6 | T7 |
|---|---|---|---|---|---|---|---|---|
| Temp. [° C.] | x | x + 1.0 | x + 2.5 | x + 4.0 | x + 5.5 | x + 9.0 | x + 11.5 | x + 13.0 |

In the flow chart of FIG. 10, the procedure starts at a step S301 where an initial value 0 is substituted for m and the integrated value Ts, then followed by a step S302.

In the step S302, the thermistor 39 detects the temperature $T_m$ (T0), with the detected temperature $T_m$ (T0) being stored in the temperature storing means 311. The operational flow then advances to a step S303. In this embodiment, T0 is at x ° C. as shown in table 2.

In the step S303, the thermistor 39 detects the next temperature $T_{m+1}$ (T1), with the detected temperature $T_{m+1}$ (T1) being stored in the temperature storing means 311 and inputted to the deviation calculating means 312, then followed by a step S304. In this embodiment, T1 is x+1.0° C.

In the step S304, the deviation calculating means 312 calculates the deviation $T_{m+1}-T_m$ between the temperature $T_{m+1}$ (T1) inputted thereto in the step S303 and the temperature $T_m$ (T0) stored in the temperature storing means 311 in the step S302, with the calculated deviation $T_{m+1}-T_m$ being inputted to the integration calculating means 317. The integration calculating means 317 adds up the deviations $T_{m+1}-T_m$ inputted thereto. At this time, the integrated value Ts is 1.0.

Moreover, when the integrated value Ts calculated in the step S304 exceeds (is equal to or more than) a predetermined value, the current limit decision means 313 sends a limit signal S to the current limiting means 314. The operational flow then advances to a step S307. On the other hand, if the integrated value Ts does not reach the predetermined value, then the operational flow proceeds to a step S306. In this connection, according to this embodiment, when the integrated value Ts exceeds 20, the operational flow advances to the step S307.

In the step S306, the value of m is incremented, and the operational flow then returns to the step S303 to repeatedly conduct the above-mentioned processing. At this time, m=1. In this embodiment, when m=4, the integrated value Ts becomes equal to or more than 20, and the operational flow then proceeds to the step 307.

In the step S307, as well as the first embodiment, the current limiting means 314 sets the upper limit value $I_{max}$ in the electric motor 4 at a limit value stored in a map in advance, and the operational flow then advances to a step S308.

In the step S308, a decision is made as to whether a reset (return) condition on the upper limit value $I_{max}$ is satisfied or not. If the reset condition is satisfied, the operational flow returns to the step S301 to repeat the above-mentioned processing when the control force N exceeds a predetermined value. Because of returning to the step S301, 0 is set as the integrated value Ts and the integrated value Ts is reset. On the other hand, if the reset condition is not satisfied, then the operational flow returns to the step S307, the current limiting means 314 sets the upper limit value $I_{max}$ at the next limit value stored in the map in advance. Moreover, until the reset condition on the upper limit value $I_{max}$ is satisfied, the current limiting means 314 successively sets the upper limit value $I_{max}$ in the electric motor 4 at a limit value stored in the map.

In this embodiment, since the integration calculating means 317 adds up the deviations $T_{m+1}-T_m$ calculated in the deviation calculating means 312 at a predetermined time interval to obtain an integrated value Ts, thereby finding a build-up quantity of temperature T of the switching transistors 38 from when the thermistor 39 begins to detect the temperature T of the switching transistors 38 until now. Therefore, the upper limit value $I_{max}$ can be decreased on the basis of the build-up quantity of the temperature T of the switching transistors 38. Accordingly, for example, in a case in which the current flowing in the electric motor 4 rapidly varies largely from a low condition, unlike the conventional technique which is made to decrease the upper limit value $I_{max}$ in the electric motor 4 after the actual temperature of the switching transistors 38 detected by the thermistor 39 exceeds a critical value, this can decrease the upper limit value $I_{max}$ in the electric motor 4 before the actual temperature T of the switching transistors 38 exceeds the critical value, which enables reliably suppressing a continuous flow of a large current in the electric motor 4, thereby preventing the adverse influence thereon.

Moreover, when the upper limit value $I_{max}$ is reset, the integrated value Ts is reset and, hence, the decision on the integrated value Ts can be made on the basis of the same predetermined value at all times without changing the decision condition in the step S305.

In addition to the motor-driven power steering system 1, the above-described first to third embodiments are also applicable to any electric motor drive apparatus for driving an electric motor.

Still moreover, although in the above-described first and second embodiments the upper limit value $I_{max}$ in the electric motor 4 is decreased when the deviation $T_{m+1}-T_m$ between the temperature $T_m$ stored in the temperature storing means 311 and the temperature $T_{m+1}$ detected next exceeds a predetermined value, it is also appropriate to decrease the upper limit value $I_{max}$ in the electric motor 4 when the deviation $T_m-T0$ between the temperature $T_m$ stored in the temperature storing means 311 and a temperature T (for example, T0) detected previously exceeds a predetermined value.

It should be understood that the present invention is not limited to the above-described embodiments, and that it is intended to cover all changes and modifications of the embodiments of the invention herein which do not constitute departures from the spirit and scope of the invention.

The invention claimed is:

1. An electric motor drive apparatus comprising:
an electric motor to be driven when energized; and
a control unit having a drive element for controlling a current flowing in said electric motor, said control unit including:
temperature detecting means for detecting a temperature of said drive element at a predetermined time interval; and
current limiting means for limiting a current flowing in said electric motor on the basis of a deviation between a temperature detected by said temperature detecting means and a temperature obtained in previous detection.

2. The apparatus according to claim 1, wherein the current limiting based on the deviation signifies that the current is limited when the deviation between said temperature detected by said temperature detecting means and said temperature obtained in the previous detection exceeds a predetermined value.

3. The apparatus according to claim 2, wherein said current limiting means limits the current flowing in said electric motor when said temperature detected by said temperature detecting means exceeds a predetermined value.

4. The apparatus according to claim 1, wherein the current limiting based on the deviation signifies that the deviation between said temperature detected by said temperature detecting means and said temperature obtained in the previous detection is obtained at a predetermined time interval and the current is limited when an integrated value obtained by adding up the obtained deviations exceeds a predetermined value.

5. The apparatus according to claim 1, wherein the limiting on the current flowing in said electric motor is made by gradually decreasing an upper limit value of current flowing in said electric motor.

6. The apparatus according to claim 5, wherein said upper limit value is decreased when a target current value flowing in said electric motor is smaller than said upper limit value and a difference between said target current value and said upper limit value is below a predetermined value.

7. The apparatus according to claim 6, wherein, in the case of decreasing said upper limit value, said control unit immediately cuts out said upper limit value when said target current value is smaller than said upper limit value and a difference between said target current value and said upper limit value exceeds a predetermined value.

8. The apparatus according to claim 1, wherein said control unit includes upper limit determining means for determining an upper limit value of current flowing in said electric motor at the predetermined time interval on the basis of a magnitude of the deviation between said temperature detected by said temperature detecting means at the predetermined time interval and said temperature obtained in the previous detection.

9. The apparatus according to claim 8, wherein said upper limit value is decreased when a target current value flowing in said electric motor is smaller than said upper limit value and a difference between said target current value and said upper limit value is below a predetermined value.

10. The apparatus according to claim 9, wherein, in the case of decreasing said upper limit value, said control unit immediately cuts out said upper limit value when said target current value is smaller than said upper limit value and a difference between said target current value and said upper limit value exceeds a predetermined value.

11. The apparatus according to claim 1, wherein said apparatus is used for a motor-driven power steering system comprising a torque sensor for detecting a control force for steering for the assistance in the control force for the steering, and said current limiting means is made to limit the current flowing in said electric motor only when a torque detected by said torque sensor exceeds a predetermined value.

12. The apparatus according to claim 11, wherein, in the case of decreasing said upper limit value, said control unit cuts out said upper limit value immediately after said torque detected by said torque sensor becomes below said predetermined value.

13. The apparatus according to claim 1, wherein a heat sink for fixedly holding said drive element is provided, and said temperature detecting means is a thermistor placed on said heat sink.

14. A motor-driven power steering system comprising:
an electric motor to be driven when energized;
a torque sensor for detecting a control force for steering; and
a control unit having a drive element for controlling a current flowing in said electric motor on the basis of a torque detected by said torque sensor, said control unit including:
temperature detecting means for detecting a temperature of said drive element at a predetermined time interval; and
current limiting means for limiting the current flowing in said electric motor on the basis of said temperature detected by said temperature detecting means and said torque detected by said torque sensor.

15. The system according to claim 14, wherein, when said torque detected by said torque sensor exceeds a predetermined value, the limiting on the current flowing in said electric motor is made by decreasing an upper limit value of current flowing in said electric motor on the basis of a deviation between said temperature detected by said temperature detecting means and a temperature obtained in previous detection.

16. An electric motor drive apparatus comprising:
an electric motor to be driven when energized; and
a control unit, wherein the control unit includes:
a drive element for controlling a current flowing in the electric motor;
a temperature detector for detecting the temperature of the drive element at predetermined time intervals; and
a current limiter for limiting the current flowing in the electric motor on the basis of a change in the temperature detected by the temperature detector between certain ones of the time intervals.

* * * * *